United States Patent
Kudo et al.

(10) Patent No.: US 12,028,788 B2
(45) Date of Patent: Jul. 2, 2024

(54) COMMUNICATION SYSTEM AND BASE STATION

(71) Applicant: NIPPON TELEGRAPH AND TELEPHONE CORPORATION, Tokyo (JP)

(72) Inventors: Riichi Kudo, Musashino (JP); Takeru Inoue, Musashino (JP); Atsushi Taniguchi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 500 days.

(21) Appl. No.: 17/604,248

(22) PCT Filed: Apr. 26, 2019

(86) PCT No.: PCT/JP2019/017945
§ 371 (c)(1),
(2) Date: Oct. 15, 2021

(87) PCT Pub. No.: WO2020/217457
PCT Pub. Date: Oct. 29, 2020

(65) Prior Publication Data
US 2022/0210622 A1 Jun. 30, 2022

(51) Int. Cl.
*H04W 4/00* (2018.01)
*H04B 17/373* (2015.01)
(Continued)

(52) U.S. Cl.
CPC ............ *H04W 4/38* (2018.02); *H04B 17/373* (2015.01); *H04W 4/029* (2018.02)

(58) Field of Classification Search
CPC ......... H04W 4/38; H04W 4/029; H04W 4/40; H04W 4/70; H04W 24/02; H04B 17/373
(Continued)

(56) References Cited

U.S. PATENT DOCUMENTS 6,581,047 B1 * 6/2003 Raykhman ............. G06N 3/126
382/243
6,771,609 B1 * 8/2004 Gudat ................ H04B 17/3912
370/332

(Continued)

OTHER PUBLICATIONS

IEEE Std 802.11 ac (TM)—2013, IEEE Standard for Information Technology—Telecommunications and Information Exchange Between Systems Local and Metropolitan Area Networks—Specific requirements, Part 11: Wireless LAN Medium Access Control (MAC) and Physical Layer (PHY) Specifications, Dec. 2016.

(Continued)

*Primary Examiner* — Amancio Gonzalez
(74) *Attorney, Agent, or Firm* — Harness, Dickey & Pierce, P.L.C.

(57) ABSTRACT

An object is to provide a communication system and a base station capable of predicting future communication quality in order to enable variations in communication quality due to variations in environment to be addressed. A communication system and a base station according to the invention learn an input and output relationship from surrounding environment information of the base station that can be acquired by a camera, a sensor, or the like, terminal information such as position information of a terminal and current communication quality to generate a learning model, and predict future communication quality using the learning model, the surrounding environment information, and the terminal information.

18 Claims, 14 Drawing Sheets

(51) Int. Cl.
*H04W 4/029* (2018.01)
*H04W 4/38* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 7,418,249 | B2* | 8/2008 | Matsumura | H04B 17/336 |
| | | | | 455/67.11 |
| 7,970,506 | B2* | 6/2011 | DeMarco | G08G 5/0086 |
| | | | | 342/29 |
| 8,019,352 | B2* | 9/2011 | Rappaport | H04W 64/00 |
| | | | | 342/450 |
| 8,391,867 | B2* | 3/2013 | Kida | H04W 36/00835 |
| | | | | 455/446 |
| 9,185,605 | B2* | 11/2015 | Tsuda | H04W 28/24 |
| 10,291,339 | B2* | 5/2019 | Goodbody | H04W 16/20 |
| 10,405,314 | B2* | 9/2019 | Mercier | H04W 72/0453 |
| 10,432,431 | B2* | 10/2019 | Alieiev | H04L 25/0226 |
| 11,019,594 | B2* | 5/2021 | Anami | H04W 64/003 |
| 11,394,436 | B2* | 7/2022 | Forenza | H04B 7/024 |
| 11,523,399 | B2* | 12/2022 | Shasha | H04L 1/20 |
| 11,568,741 | B2* | 1/2023 | Lee | G08G 1/0112 |
| 11,646,773 | B2* | 5/2023 | Forenza | H04B 7/0456 |
| | | | | 375/267 |
| 11,679,781 | B2* | 6/2023 | Kim | G01C 21/3889 |
| | | | | 701/25 |
| 11,923,931 | B2* | 3/2024 | Forenza | H04B 7/0626 |
| 11,930,401 | B2* | 3/2024 | Matsunaga | H04W 4/44 |
| 2009/0286526 | A1* | 11/2009 | Matsunaga | H04W 24/00 |
| | | | | 455/456.1 |
| 2010/0029263 | A1* | 2/2010 | Senoo | H04W 48/18 |
| | | | | 455/450 |
| 2012/0230249 | A1* | 9/2012 | Fukumoto | H04W 52/46 |
| | | | | 370/315 |
| 2018/0242191 | A1* | 8/2018 | Lundqvist | H04W 72/54 |
| 2018/0262367 | A1* | 9/2018 | Alieiev | H04W 24/10 |
| 2020/0367067 | A1* | 11/2020 | Haley | H04B 17/24 |
| 2022/0014934 | A1* | 1/2022 | Matsunaga | H04W 4/40 |
| 2023/0237349 | A1* | 7/2023 | Donoho | G06Q 50/26 |
| | | | | 706/46 |

OTHER PUBLICATIONS

Ghosh, Amitava, et al. "Millimeter-wave Enhanced Local Area Systems: A high-data-rate Approach for Future Wireless Networks." IEEE Journal on Selected Areas in Communications 32.6 (2014): 1152-1163.

H. Okamoto, et al. [Technical Exhibition] "Real time Throughout Estimation Using Depth Images for mmWave Communications" IEICE Technical Report, SR2016-55 (Oct. 2016), The Institute of Electronics, Information and Communication Engneering.

H. Okamoto, et al. "Throughput Estimation Using Online Machine Learning Algorithm from Depth-images for mmWave Communications", IEICE Technical Report, SR2015-96 (Mar. 2016), The Institute of Electronics, Information and Communication Engneering.

* cited by examiner

COMMUNICATION SYSTEM AND BASE STATION

CROSS-REFERENCE TO RELATED APPLICATIONS

This application is a 371 U.S. National Phase of International Application No. PCT/JP2019/017945 filed on Apr. 26, 2019. The entire disclosures of the above application is incorporated herein by reference.

TECHNICAL FIELD

The present disclosure relates to prediction of communication quality in a system in which communication quality varies due to a surrounding environment and control performed by a base station with a communication device mounted therein.

BACKGROUND ART

Internet of things (IoT) in which various devices are connected to the Internet has been increasingly realized, and connection of various devices such as vehicles, drones, and construction machinery vehicles is in progress. Supporting wireless standards such as a wireless local area network (LAN), Bluetooth (registered trademark), LTE or 5G cellular communication, low power wide area (LPWA) communication for IoT, an electronic toll collection system (ETC) used for vehicle communication, Vehicle Information and Communication System (VICS) (registered trademark), and ARIB-STD-T109 that are defined in the standard specification IEEE802.11 as wireless communication standards have been developed, and distribution in the future is expected.

Wireless communication has been used for various applications, but wireless communication does not always meet required conditions for communication quality depending on services, which is problematic. For example, since high frequencies in a millimeter band are used for 5G of IEEE 802.11ad and cellular communication, blocking due to shielding objects between transmission and reception in wireless communication causes a serious problem. Blocking due to shielding objects and changes in propagation environments due to motion of reflecting objects affect communication quality of wireless communication not only at frequencies in a millimeter wave band but also at other frequencies. In addition, it is also known that Doppler shift caused by movement of a reflecting object affects communication.

CITATION LIST

Non Patent Literature

Non Patent Literature 1: IEEE Std 802.11ac (TM)-2013, IEEE Standard for Information Technology-Telecommunications and Information Exchange Between Systems Local and Metropolitan Area Networks-Specific requirements, Part 11: Wireless LAN Medium Access Control (MAC) and Physical Layer (PHY) Specifications, December 2016

Non Patent Literature 2: Ghosh, Amitava, et al. "Millimeter-wave Enhanced Local Area Systems: A high-data-rate Approach for Future Wireless Networks." IEEE Journal on Selected Areas in Communications 32.6 (2014): 1152-1163.

SUMMARY OF THE INVENTION

Technical Problem

In a case in which wireless communication functions are mounted in vehicles, drones, construction machinery vehicles, robots, or other devices and there are required conditions in relation to throughputs, delays, continuity, stability, and other aspects of communication quality for the communication thereof, there is a problem that communication quality due to changes in a surrounding environment significantly affects services and systems provided by the devices.

Thus, in view of the aforementioned circumstances, an object of the invention is to provide a communication system and a base station capable of predicting future communication quality in order to enable variations in communication quality due to variations in environment to be addressed.

Means for Solving the Problem

A communication system according to the invention is adapted such that a device that has a wireless communication function predicts future communication quality from information regarding control of the device itself or a change in surrounding environmental information using information from a camera, a sensor, and another surrounding environment information collection device that acquire information on a surrounding environment.

Specifically, a communication system according to the invention is a communication system that includes a base station that communicates with a wireless terminal, the system including: a base station management unit generates base station management information including at least position information of the wireless terminal; an object detection unit extracts a predetermined object from surrounding information about the base station's surroundings and outputs the predetermined object along with a feature amount of the object as object information; a communication quality learning unit performs machine learning on a relationships between quality of communication between the base station and the wireless terminal and both the base station management information and the object information to generate a learning model; and a communication prediction unit applies the base station management information generated by the base station management unit and the object information output by the object detection unit to the learning model generated by the communication quality learning unit to predict communication quality of a predetermined period of time later.

Machine learning of a relationship between a circumstance in the surroundings of the device and a communication state is performed in advance to form a learning model. The communication system can predict future communication quality from the current circumstance in the surroundings of the device using the learning model. Therefore, the communication system can prepare a countermeasure against variations in future communication quality in advance such that the device is not affected or affected less. The invention can thus provide a communication system capable of predicting future communication quality in order to enable variations in communication quality to be addressed.

The base station management information of the communication system according to the invention includes unique information of the wireless terminal provided as a notification from the wireless terminal. It is possible to improve precision of predicting the communication quality.

In the communication system according to the invention, the object information is obtained by performing statistical processing on a plurality of pieces of the object information acquired at different times. It is possible to reduce a burden of performing an operation for predicting communication quality.

The communication system according to the invention further updates an object definition that designates the predetermined object extracted by the object detection unit. It is possible to improve precision of predicting the communication quality.

In the communication system according to the invention, the communication quality learning unit uses steady time communication quality obtained by collecting information regarding the communication quality to information regarding the wireless terminal for a specific period of time and performing statistical processing (for example, a mode value, an average value, or exclusion of a singularity determined therefrom) on the collecting information, to perform machine learning with the communication quality that is more than a predetermined threshold value away from the steady time communication quality. It is possible to predict communication quality only for a state that is significantly different from the steady state by recognizing the steady state in advance and to reduce a burden of performing an operation for predicting communication quality and a burden of controlling the device.

A base station according to the invention is a base station that the aforementioned communication system includes, the base station including: the base station management unit; the object detection unit; the communication quality learning unit; and the communication prediction unit.

Note that the base station according to the invention may include, for enabling a learning model introduced from the outside to be used: the base station management unit; the object detection unit; the communication prediction unit; and a communication unit, and the communication unit may transfer the communication quality, the base station management information, and the object information to the communication quality learning unit that is provided outside, and receive the learning model from the communication quality learning unit to transfer the learning model to the communication prediction unit.

Furthermore, the base station according to the invention may include, for causing an external device to predict communication quality: the base station management unit; the object detection unit; and a communication unit, and the communication unit may transfer the communication quality, the base station management information, and the object information to the communication quality learning unit that is provided outside, transfer the base station management information and the object information to the communication prediction unit that is provided outside, and receive communication quality of the predetermined period of time later from the communication prediction unit.

Effects of the Invention

According to the invention, it is possible to predict communication quality indicating a transmission capacity, a throughput, a delay, continuity, stability, and variations thereof in uplink or downlink communication between a wireless base station and a wireless terminal using surrounding environment information obtained by a surrounding environment information collection device such as a camera or a sensor and base station management information including position information of the wireless terminal with which the base station communicates.

DESCRIPTION OF EMBODIMENTS

Embodiments of the invention will be described with reference to the accompanying drawings. The embodiments described below are examples of the invention and the invention is not limited to the embodiments described below. Note that components with the same reference signs in the specification and the drawings are assumed to be the same components.

First Embodiment

Figure 1:
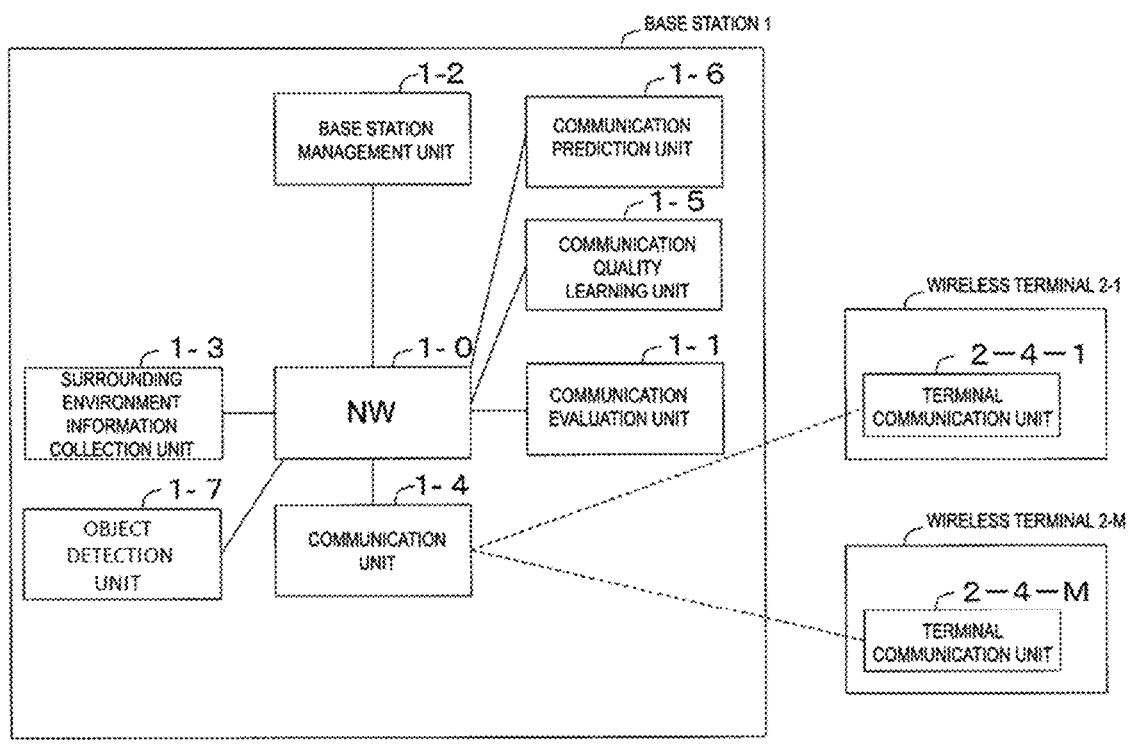
FIG. 1 is a diagram for explaining a communication system according to the invention.

FIG. 1 is a block diagram illustrating a configuration example of a communication system according to the first embodiment. The communication system is a communication system that includes a base station 1 that communicates with a wireless terminal 2, the system including: a base station management unit 1-2 that generates base station management information including at least position information of the wireless terminal 2; an object detection unit 1-7 that extracts a predetermined object from surrounding information of the base station 1 and outputs the predetermined object along with a feature amount of the object as object information; a communication quality learning unit 1-5 that performs machine learning of quality of communication between the base station 1 and the wireless terminal 2 and a relationship between the base station management information and the object information to generate a learning model; and a communication prediction unit 1-6 that predicts communication quality of a predetermined period of time later from the base station management information generated by the base station management unit 1-2 and the object information output by the object detection unit 1-7 using the learning model generated by the communication quality learning unit 1-5.

In the first embodiment, the base station 1 includes the base station management unit 1-2, the object detection unit 1-7, the communication quality learning unit 1-5, and the communication prediction unit 1-6.

The communication system is configured of the base station 1 and the wireless terminals 2-1 to 2-M (M is equal to or greater than 1). The base station 1 is hardware that performs communication with one or more wireless terminals 2, supports one or more frequencies and one or more communication schemes, and can perform communication with one or more terminals by one or more communication schemes or at one or more frequencies.

The base station 1 includes: a base station NW unit 1-0 that performs data input and output processing with functional blocks in the base station; a communication evaluation unit 1-1 that evaluates quality of communication between the base station 1 and the external wireless terminals 2; a base station management unit 1-2 that controls the base station, components of the base station, and communication of the base station and generates base station management information of the wireless terminals 2-1 to 2-M with which the base station 1 communicates; a surrounding environment information collection unit 1-3 that collects surrounding environment information of the base station 1 using a visible light camera, an infrared camera, an electromagnetic wave sensor, an optical sensor, a sound wave sensor, or the like; an object detection unit 1-7 that extracts an object related to quality of communication with an external communication device from the information collected by the surrounding environment information collection unit 1-3; a communication unit 1-4 that performs communication with the external wireless terminals 2 using a predetermined communication scheme (protocol); a communication quality learning unit 1-5 that performs machine learning of an input and output relationship (learning model) of the surrounding object information, the surrounding environment information, and the communication quality to output future communication quality from the surrounding object information, the base station management information, and communication quality information that is information related to the communication quality obtained by the communication unit as a result of evaluating the quality of communication; and a communication prediction unit 1-6 that predicts future communication quality using the input and output relationship obtained by the communication quality learning unit 1-5, the surrounding object information, and the base station management information.

Note that the base station management information includes at least position information of each wireless terminal from among information regarding position information/an orientation/an ID/a state/a speed of each wireless terminal 2, position information/an orientation/a posture/an ID/a state/control of the base station 1, position information/ orientations/IDs/states/control of the components of the base station 1, an attachment position/an orientation/an ID/a state/control/a communication scheme/a communication frequency/a communication band of the communication unit 1-4. Note that "information unique to the wireless terminal" is information regarding position information/an orientation/ an ID/a state/a speed of the wireless terminal 2.

Further, a plurality of communication units 1-4 may be included in accordance with the type of the communication scheme.

Here, future communication quality to be predicted is communication quality of an arbitrary period of time later than information of a signal source input to the communication prediction unit 1-6. The arbitrary time specifically means a time later than $(T_S+T_A)$ that is a sum of a signal process time $T_S$ required by the surrounding environment information collection unit 1-3 to acquire information that is required by the object detection unit 1-7 to extract object information and required by the communication prediction unit 1-6 to perform prediction and an addressing time $T_A$ required for some control performed on the predicted communication quality.

The wireless terminals 2 include terminal communication units 2-4 each of which performs communication with the communication unit 1-4 of the base station 1. Each terminal communication unit 2-4 is, for example, a functional unit capable of performing wireless communication such as a wireless LAN defined by IEEE802.11, Wigig (registered trademark), IEEE802.11p, the ITS communication standard, LTE or 5G cellular communication, or low power wide area (LPWA) or communication using sound waves, electricity, infrared light, or visible light.

Here, each wireless terminal 2 is a device capable of performing wireless communication with the base station 1 using a predetermined communication protocol or may be a mobile machine such as a vehicle, a drone, a construction machinery vehicle, or a robot including such a device.

The base station management information includes, as described above, at least position information of the wireless terminal among a position/an orientation/a posture/an ID/a state/a speed of the wireless terminal with which the base station 1 performs communication, a position/an orientation/a posture/an ID/a state/control of the base station 1, positions/orientations/IDs/states/control of components of the base station 1, an attachment position/an orientation/an ID/a state/control/a communication scheme/a communication frequency/a communication band of the communication unit 1-4.

The surrounding object information includes, for example, one or more pieces of information among a position/a size/a moving speed/a shape/a medium of an object that is present in the vicinity of the base station 1, the wireless terminal 2, or a wireless propagation path between the base station 1 and the wireless terminal 2, which is extracted from an image captured by a visible light camera or an infrared camera or information of electromagnetic waves/light/and reflected waves of sound waves collected by an electromagnetic sensor, an optical sensor, a sound wave sensor, or the like. Alternatively, the surrounding object information may include one or more pieces of information among frequencies/intensity of electromagnetic waves/light/ sound waves in the vicinity of the base station 1 or the wireless terminal 2 collected by the electromagnetic wave sensor, an optical sensor, a sound wave sensor, or the like.

Communication quality information is information related to communication quality required for communication such as services used for the communication and control and management of devices. The communication quality indicates a throughput, a packet arrival delay in a certain section, communication continuity that satisfies a certain throughput and a packet arrival delay condition, a packet arrival rate, stability of a throughput, a packet arrival delay, and a packet arrival rate, an arbitrary percentage value of cumulative probability distribution in a certain time section of the aforementioned parameters, a bit rate that can be transmitted at a certain error rate or less, and the like in an uplink or downlink communication. The communication quality information is information related to these and includes a throughput instantaneous value in a specific time, a section arrival delay of a specific packet, an arrival rate of a specific packet, reception power of a packet, information regarding variations in reception power of a packet, quality information of a packet exchanged in control information, precision of synchronization with a terminal, signal distortion information, interference signal power, interference conditions, Doppler frequency information, circuit stability information, and the like that may be related to the communication quality in addition to values obtained by estimating communication quality itself.

To use the surrounding environment information and the base station management information to learn a relationship between these and communication quality, the communication quality learning unit 1-5 defines, in advance, feature amounts of input object information to perform machine learning. The machine learning is learning using a machine learning algorithm such as a support vector machine, multilayer perceptron, a k nearest neighbor method, or a random forest, learning based on deep learning such as a recurrent neural network (RNN), a convolutional neural network (CNN), or a long short term memory (LSTM), on-line learning, or the like. The communication quality learning unit 1-5 can sequentially perform such learning. Also, a configuration in which a plurality of different coefficients, different schemes, and different coupling methods are prepared from the aforementioned schemes and a determined result is selected through majority vote or a determination result with high reliability is selected from a plurality of determination results may be employed.

The learning can be performed in an actual environment with the base station 1 actually performing communication, can be performed using another base station or data acquired by another base station specially prepared for the learning, or can be performed in a simulation space that simulates an environment that is as close to an actual environment in the real world as possible.

The input and output relationship (the learning model for estimating future communication quality) generated by the communication quality learning unit 1-5 as a result of performing learning is output to the communication prediction unit 1-6. The communication prediction unit 1-6 may use a learning model that is present outside the base station 1. In this case, the base station 1 includes a base station management unit 1-2, an object detection unit 1-7, a communication prediction unit 1-6, and communication units (1-4, 1-8), and the communication units transfer the communication quality, the base station management information, and the object information to the communication quality learning unit that is provided outside, and receive the learning model from the communication quality learning unit to transfer the learning model to the communication prediction unit 1-6.

In order to limit targets for which learning and communication quality estimation are to be performed, it is also possible to perform learning such that the communication prediction unit 1-6 learns only specific events related to communication quality. For example, the communication quality learning unit 1-5 performs learning such that the communication prediction unit 1-6 predicts a communication quality degradation event or a communication quality improving event with high correlations with each or both of the surrounding object information and the base station management information. In other words, the communication quality learning unit 1-5 stores steady time communication quality for terminal information from a result (for example, a result of performing statistical processing such as a mode value, an average value, or exclusion on a singularity determined therefrom) of steadily evaluating terminal information (information regarding the wireless terminal) including the position of the wireless terminal 2 for quality (information regarding communication quality) of communication with the wireless terminal 2, and performs machine learning of communication quality (a communication quality degradation event or a communication quality improving event) that is separated from the steady time communication quality by a predetermined threshold value or more. The communication quality learning unit 1-5 outputs the thus learned learning model to the communication quality prediction unit 1-6.

Note that the communication quality degradation event can be defined as an event in which predefined communication quality criteria (a bit number per time, a bit number per time and frequency, a packet loss, a packet loss rate, RSSI degradation, RSRQ degradation, a packet transmission rate, how much these parameters have changed from those at normal times, and a feature amount extracted from the plurality of parameters) satisfy predefined conditions. Also, the communication quality degradation event may also be defined as an event categorized as communication quality degradation due to a change in surrounding object information or base station management information in classification of machine learning. Here, a case in which RSSI degradation and a packet loss have occurred at the same time, for example, is exemplified as the feature amount extracted from the plurality of parameters. Through the prediction of the communication quality degradation event, it is possible to expect an adverse influence on service quality of wireless communication. On the other hand, the opposite to the above description is applied to the communication quality improving event. However, since the modulation scheme, the error correcting code rate, and the space multiplexing number of the communication are typically not changed to ones with higher bit rates with an improvement in communication quality, it is difficult to learn the event with the packet loss rate unlike the communication quality degrading event, and learning of an improvement in reception level or signal quality of a known signal such as an improvement in RSSI or RSRQ is assumed.

In a case in which targets to be learned are limited, learning only target events may lead to a bias, and it is thus preferable to learn data in the steady state in which necessary parameters have been acquired as well. At this time, it is also possible to set a learning frequency using a specific event occurrence frequency. It is possible to use the frequency of occurrence of the communication quality degradation event to acquire data in the steady state at an equivalent learning frequency or to set the frequency to be a time as high as the frequency of occurrence ($0<\alpha<\infty$).

Second Embodiment

Figure 2:
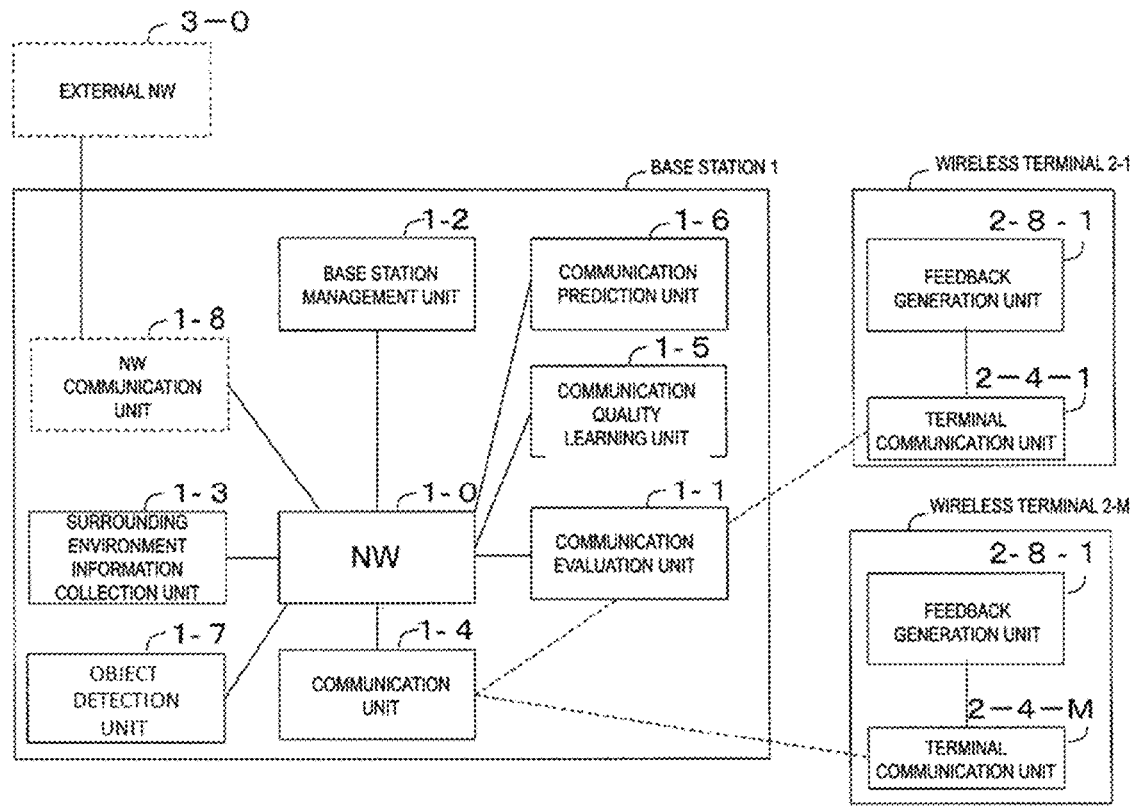
FIG. 2 is a diagram for explaining the communication system according to the invention.

FIG. 2 is a block diagram illustrating a configuration example of a communication system according to the second embodiment. In the second embodiment, the wireless terminal 2 in the communication system according to the first embodiment further includes a feedback generation unit 2-8. The feedback generation unit 2-8 inputs information that can be used for learning as feedback information to a communication quality learning unit 1-5 of a base station 1 via a terminal communication unit 2-4. The feedback information is a position/a speed/a state/an ID/a type/a shape of the wireless terminal 2/an attachment position of a communication unit/owner information and the like and is "information unique to the wireless terminal".

The communication quality learning unit 1-5 can enhance accuracy of the learning model and estimate communication quality in accordance with a form (a PC, a smartphone, a car, a drone, or the like), a state (a position, a speed, a power source, operations, and the like), communication (Wi-Fi, LTE, 5G, LPWA, or the like) of the wireless terminal, using the feedback information for learning.

Further, the communication system according to the second embodiment includes an NW communication unit 1-8 and performs communication with an external NW 3-0. The base station 1 can acquire auxiliary information necessary to learn and predict communication quality from the external NW 3-0 and use the auxiliary information for learning and prediction. The auxiliary information that can be acquired from the external NW 3-0 is a position/a speed/a state/an ID/a type/a shape of the wireless terminal 2-$i$/an attachment position of the communication unit/owner information, weather information, time information, and environment information related to an area where communication is performed. It is possible to enhance efficiency and accuracy of learning and prediction using the auxiliary information.

Third Embodiment

Figure 3:
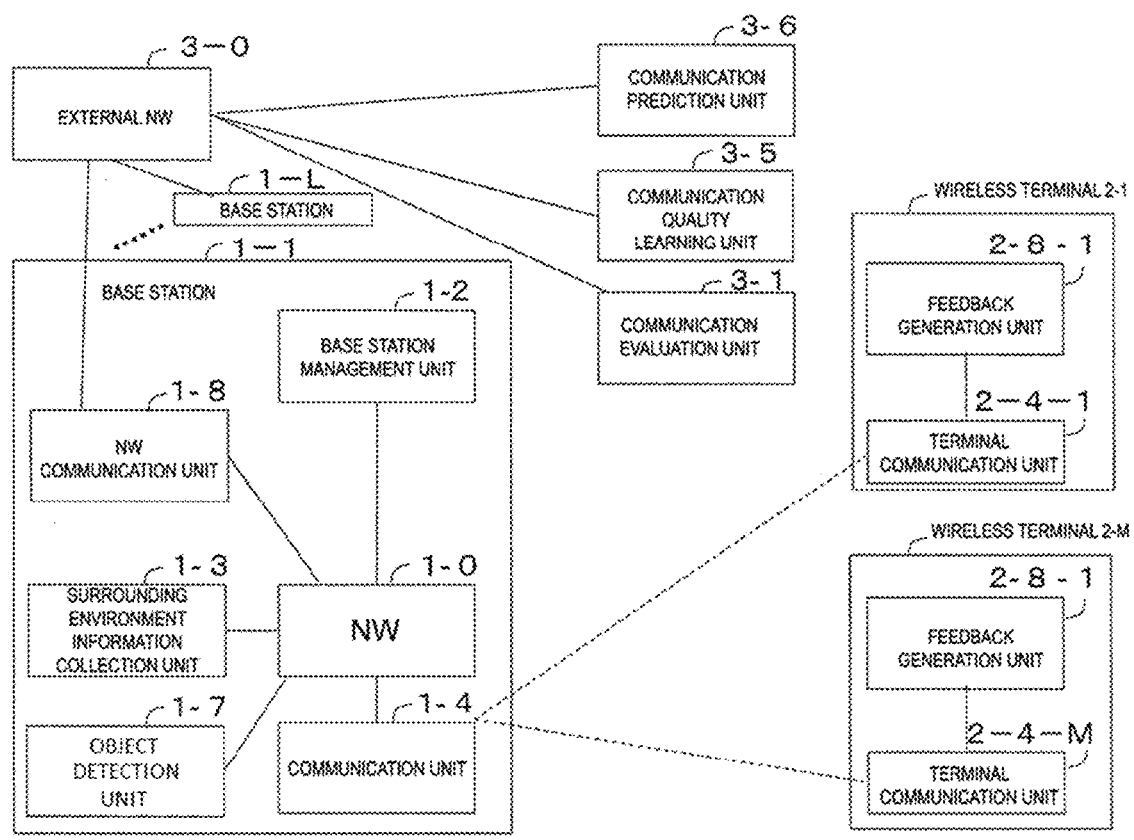
FIG. 3 is a diagram for explaining the communication system according to the invention.

FIG. 3 is a block diagram illustrating a configuration example of a communication system according to the third embodiment. The third embodiment is an aspect in which at least one of the communication prediction unit 1-6, the communication quality learning unit 1-5, and the communication evaluation unit 1-1 in the communication system according to the first or second embodiment is connected to an external NW (a communication prediction unit 3-6, a communication quality learning unit 3-5, and a communication evaluation unit 3-1). A base station 1 according to the third embodiment includes a base station management unit 1-2, an object detection unit 1-7, and communication units (1-4, 1-8), and the communication units transfer the communication quality, the base station management information, and the object information to the communication quality learning unit 3-5 that is provided outside, transfer the base station management information and the object information to the communication prediction unit 3-6 that is provided outside, and receive communication quality of the predetermined time later from the communication prediction unit 3-6.

In such an aspect, it is possible to share a physical or virtual operation unit in evaluation of communication quality, generation of a learning model, or prediction of communication, to share a part or all of an object definition and the learning model, to perform communication prediction using a plurality of pieces of base station management information, and utilization of learning results of other base stations through transfer learning, in conjunction with a plurality of base stations (base stations 1-1 to 1-L).

Note that in the first to third embodiments, base station management information that mainly includes position information of the wireless terminals 2-1 to 2-M with which the base station 1 performs communication may be periodically acquired directly from the wireless terminals 2-1 to 2-M via the communication unit 1-4, or the position information of the wireless terminals 2-1 to 2-M managed by the external NW 3-0 may be acquired via the NW communication unit 1-8. As the position information of the wireless terminals managed by the external NW 3-0, the wireless terminals 2-1 to 2-M may periodically register position information of the wireless terminals themselves, or results obtained by measuring positions from communication relationships with a plurality of base stations or determining the positions in combination with a GPS may be registered.

Fourth Embodiment

Figure 4:
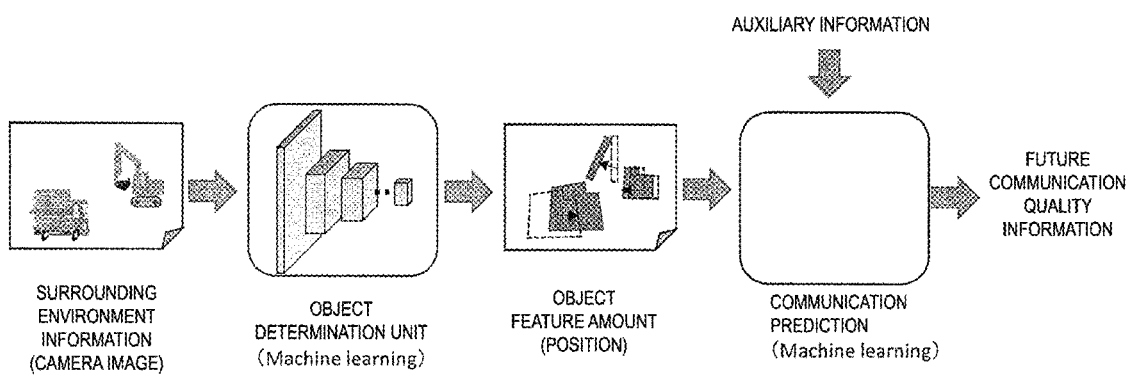
FIG. 4 is a diagram for explaining an approach for predicting future communication quality in the communication system according to the invention.

FIG. 4 illustrates an overview of a flow of predicting future communication quality in the communication systems disclosed in the first to third embodiments. Hereinafter, a flow mainly of the object detection unit 1-7 and the communication prediction unit 1-6 will be described using FIG. 4.

If the surrounding environment information collection unit 1-3 collects surrounding information from information from the camera and the sensor, then the object detection unit 1-7 extracts, from the information, the position, the size, and state information of an object or a part of the object that affects communication. Although the cubes inside the object detection unit in the drawing are illustrated with an image of using deep learning in which a plurality of convolutional layers are used for determination, it is possible to use an engine for machine learning, a representative example of which is deep learning. The object information extracted here is information including at least one of a type, a position (a two-dimensional position or a three-dimensional position), a shape, and a color of the object. In the illustrated example, recognition of states of a car or a construction machinery vehicle and an arm thereof is illustrated as an example.

Here, although the object detection unit 1-7 acquires the object information at a certain time cycle, it is possible to perform statistical processing using the information within a specific period of time to reduce a burden of the communication quality prediction unit 1-6 to perform an operation. In a case in which the time cycle at which communication quality is predicted is 1 second, and the camera obtains a video at 10 frames per second (FPS), for example, the object information can be acquired at every 1/10 seconds. In other words, it is possible to obtain ten pieces of object information when one index is obtained by the communication prediction unit 1-6. In a case in which the communication prediction unit 1-6 performs prediction at a cycle of Tc seconds, and the object detection unit 1-7 performs object detection at a cycle of To seconds, for example, it is possible to use object information corresponding to an integer obtained by rounding off the value obtained by Tc/To to the nearest decimal for communication quality prediction performed once. The number is defined as No. Although it is also possible to directly use it as No sets of input signals, communication quality to be addressed has a cycle of To, and it is thus possible to perform statistical processing to obtain information at a cycle of To.

As long as the information relates to the position and the shape, it is possible to use center values and average values of first (oldest) object information, the last (latest) object information, both the first and last object information, and the same obtained information or average values or center values obtained by deleting some information at both extremes from among the obtained No sets of pieces of object information. Further, it is also possible to extract information regarding how first to No-th object information has been changed as change information. For example, change information (speed information) in position information (two-dimensional coordinates or three-dimensional coordinates including the depth), color change information, object shape or size change information, and rotation speed information are exemplified. Further, it is also possible to extract difference information from the first to No-th information and further information regarding acceleration by further extracting difference information from the difference information. It is also possible to use an inclination of a graph obtained by performing fitting with a quadratic function to minimize a square error on distribution obtained by plotting position information with respect to time, instead of simply using the difference information. For example, it is also possible to obtain acceleration information by extracting a difference in the first to (No−1)-th object information from the second to No-th object information and further obtaining each difference using the obtained (No−1) pieces of difference information or to obtain acceleration from an inclination of the aforementioned quadratic function fitted to minimize the square error.

Further, the object detection unit 1-7 can further include an object filter unit to perform filtering using the object information and delete unnecessary information. For example, the object filter unit can store, in advance, the fact that the communication quality has not been affected in objects at positions lower than a specific value in the height direction in the object information, and it is possible not to output the object information that meets the condition. Also, it is possible to refer to position information fed back from the wireless terminal 2-i that is a communication counterpart, store the type and the position of the object that has an influence in an object filter unit in accordance with an area where the wireless terminal 2-i is present, and to prevent object information corresponding to unnecessary information from being output.

Further, it is also possible to update the type of object for which the object detection unit 1-7 performs determination in accordance with update information input from the outside and thereby to efficiently determine the object in the surroundings to be given for the latest communication.

The thus obtained object information is input to the communication prediction unit 1-6. The communication prediction unit 1-6 predicts future communication quality from input object information using the input and output relationship (learning model) generated by the communication quality learning unit 1-5 using deep learning including machine learning algorithms such as a support vector machine, a multilayer perceptron, a k-nearest neighbor method, and a random forest, a recurrent neural network (RNN), a convolutional neural network (CNN), and a long short term memory (LSTM) and outputs the future communication quality. Also, a configuration in which a plurality of different coefficients, different schemes, and different coupling methods are prepared from the aforementioned schemes and a determined result is selected through majority vote or a determination result with high reliability is selected from a plurality of determination results may be employed.

Filtering processing may be performed for selecting, as information to be input to the communication prediction unit 1-6, information obtained by the object detection unit 1-7 and the base station management unit 1-2 extracting a new feature amount through main component analysis using the object information, the terminal information, and the feedback information from the outside and performing dimensionality reduction to reduce the number of parameters or for selecting information that satisfies a certain condition. The dimensionality reduction may be centrally performed on the feedback information from the object detection unit 1-7, the base station management unit 1-2, and the outside.

A case in which auxiliary information other than the object information is used as an input signal to output future communication quality will be described. The communication evaluation unit 1-1 can input parameters related to obtained current or past communication quality to the communication prediction unit 1-6. Also, the terminal information including one or more of position information/orientations/postures/IDs/states/control of the wireless terminals 2-1 to 2-M with which the communication unit 1-4 is activated to perform communication, position information/orientations/IDs/states/control of terminal components, and an attachment position/an orientation/an ID/a state/control of the communication device can be acquired and input to the communication prediction unit 1-6.

Further, the communication prediction unit 1-6 can also output a plurality of candidates for future communication quality information. In a case in which position information of the terminal is input as auxiliary information to the communication prediction unit 1-6, the communication prediction unit 1-6 can apply the input and output relationship to a plurality of different patterns and to predict a plurality of patterns of future communication quality by preparing possible future states of the terminal and inputting the states to the communication prediction unit 1-6. In this manner, the terminal can select an option to improve communication quality.

Here, it is also possible to include an object updating unit in the object detection unit 1-7 to update the input and output relationship for obtaining object information by the object detection unit 1-7. Updating can be performed with an increase in objects that newly affect the communication as surrounding environment information such as distribution of drones with outrageous designs and flying cars or with changes in design of existing objects, for example.

As described hitherto, a huge amount of learning is needed to immediately predict communication quality such as a throughput in a case in which communication quality is predicted. However, it is possible to more efficiently perform learning by limiting events to be detected to moments at which communication quality is degraded by an amount that is equal to or greater than a specific amount or at which communication quality drops to the value that is equal to or less than a predefined threshold value, or on the contrary, by limiting the events to be detected to events that communication quality is improved by the amount that is equal to or greater than a specific amount. At this time, the base station can store terminal information that may become equal to or less than a predefined threshold value or may become equal to or greater than a threshold value due to influences of objects in advance from conditions at a steady time, and the communication quality prediction according to the invention can be performed only in a case in which the condition is met. For example, communication quality is expected to be not satisfactory even in a steady state under a certain position condition that the terminal position is separated from the communication base station to some extent or there is blocking due to a building. Although it is considered that communication quality is uniquely determined from the terminal information if every matter is expressed in the steady state, large influences of objects on the communication may be caused. In other words, it is possible to efficiently learn a model between changes in communication quality from the steady state and influences of object information, by performing learning on the object information when the communication quality is changed from that in the steady state.

Fifth Embodiment

Figure 5:
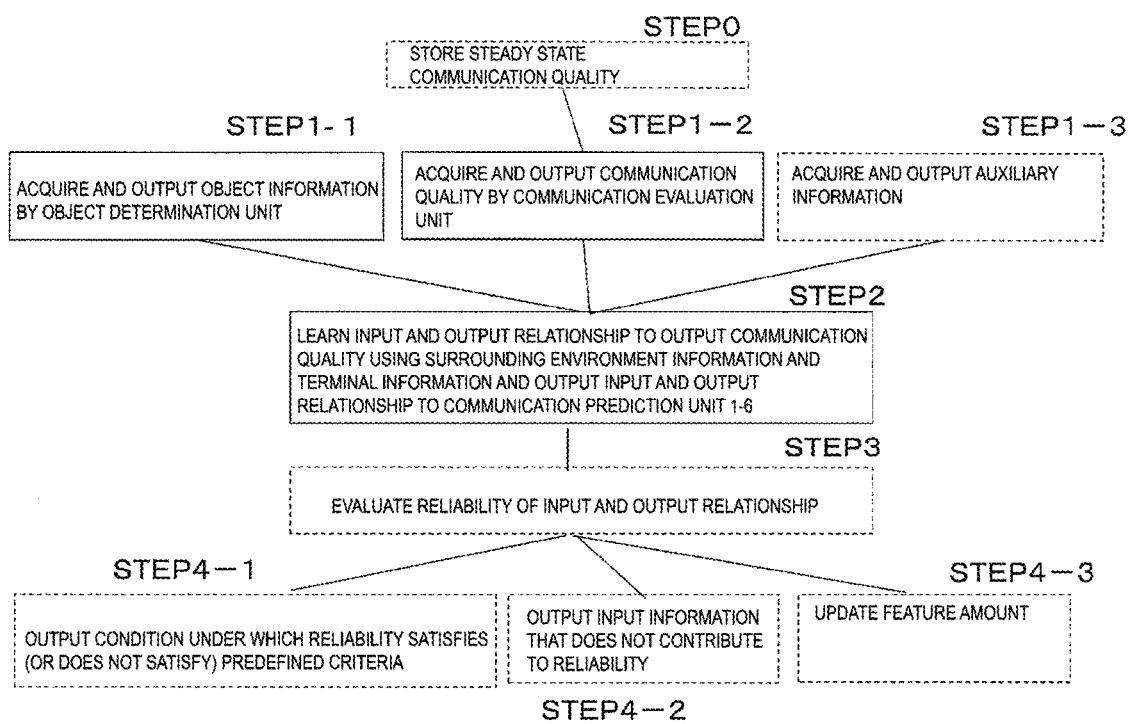
FIG. 5 is a diagram for explaining a method for predicting future communication quality in the communication system according to the invention.

FIG. 5 is a diagram for explaining a flow of machine learning performed by the communication quality learning unit 1-5 or 3-5 in the communication systems according to the first to third embodiments. First, a flow in a block surrounded by the solid line, which is a minimum form, will be described. In order to predict communication, the surrounding environment information collection unit 1-3 acquires surrounding environment information and inputs the result thereof to the object detection unit 1-7. Note that the surrounding environment is moving objects such as cars and pedestrians and fixed objects such as buildings in the surrounding of the base station.

The object detection unit 1-7 generates object information as described above and outputs the object information to the communication quality learning unit 1-5 or 3-5 (Step 1-1). The communication evaluation unit 1-1 or 2-1 acquires communication quality at a certain time (Step 1-2) and outputs the communication quality to the communication quality learning unit 1-5 or 3-5. The communication quality learning unit 1-5 or 3-5 performs machine learning using the object information and the position information of the wireless terminal and creates an input and output relationship (learning model) for outputting future communication quality. The communication quality learning unit 1-5 or 3-5 outputs the learning model to the communication prediction unit 1-6 (Step 2). The communication prediction unit 1-6 uses the learning model to estimate future communication quality from the object information based on current surrounding environment information acquired by the surrounding environment information collection unit 1-3.

In the learning method in FIG. 5, it is possible to input terminal information collected from the wireless terminal 2-*i* via the communication unit 1-4 and information regarding the base station generated by the base station management unit 1-2 as auxiliary information to the communication quality learning unit 1-5 or 3-5 in order to enhance prediction accuracy through learning (STEP 1-3). Here, in the case of the communication system in FIG. 3, the information regarding the base station may be information from the base station management unit of each of the plurality of base stations. The auxiliary information indicates terminal information including one or more pieces of information regarding control/position information/an orientation/a posture/an ID/a state of the terminal fed back from the wireless terminal 2, control/position information/orientations/postures/IDs/ states of terminal components, a communication scheme/a frequency/a frequency band and the like of the communication unit of the terminal, a base station management information including one or more of position information/ orientations/IDs/states/control of components of the base station 1 in the base station management unit 1-2, an attachment position/an orientation/an ID/a state/control/a communication scheme/a communication frequency/a communication band of the communication unit 1-4, which will be described later, and other information with a correlation with communication quality obtained via the communication unit 1-4 of the base station, and it is possible to use one or a plurality of pieces of information from among these.

In the learning method in FIG. 5, the communication prediction unit 1-6 or 3-6 can store communication quality in a steady state in advance in order to enhance learning efficiency with respect to input communication quality information or to provide a specific communication event (degradation of communication quality or an improvement in communication quality) (Step 0). The steady communication quality described here indicates communication quality expected in a case there are no influences of objects that significantly affect the communication or simply an expected value obtained from past communication quality. This method is effective when the objects that significantly affect the communication are limited and the objects appear at low frequencies or a time during which no objects are present continues for a specific time or longer. In other words, it is possible to obtain communication quality from the terminal information without using machine learning if there are no objects. It is only necessary to determine whether objects can affect communication quality from object information only in a case in which the objects are present, and it is only necessary to perform learning on the objects. In the contrary, in a case in which objects that affect communication are constantly present, it is possible to use a mode value or an average value of the communication quality as communication quality in the steady state. It is possible to standardize communication quality, the value of which ranges widely depending on the location or conditions, by setting the amount of change with respect to the steady communication quality as a learning target, and it is thus possible to efficiently perform the learning.

Also, it is possible to store an average value, a center value, or an arbitrary outage value of a cumulative probability in accordance with terminal information (position information or state information of the terminal) from past communication records of the wireless terminal 2-*i* or communication of other terminals. At this time, it is also possible to perform filtering with detection information of surrounding object information and to store an expected value in a case in which there are no objects. In a case in which past communication quality information is simply used, it is possible to use the past communication quality information with influences of parameters that affect communication quality, such as a used frequency bandwidth and a consumption mode removed. In one of or both a case in which the communication quality in the steady state obtained here is equal to or less than a predefined threshold value and a case in which the communication quality is equal to or greater than a predefined threshold value, learning can be performed.

In the learning method in FIG. 5, it is possible to improve efficiency of the following learning and prediction and to enhance accuracy after learning an input and output relationship and evaluating classification of the range to which the input and output relationship is applied, prediction accuracy, or importance of the input parameters. In Step 3, the data acquired for learning is used to evaluate reliability of the input and output relationship. Some evaluation methods will be described below.

First Evaluation Method

An input and output relationship (learning model) that has already been learned is used to evaluate prediction performance for new learning data. Specifically, the result of communication prediction output by the communication prediction unit 1-6 or 3-6 and the communication quality actually measured by the communication evaluation unit are compared to evaluate a deviation therebetween. In regard to how large the deviation is, the communication quality learning unit 1-5 or 3-5 more actively employs new information as the input and output relationship to perform learning, or the communication quality learning unit 1-5 or 3-5 does not perform learning with uncertain data in order to reliably estimate communication quality. In the former case, the communication quality learning unit 1-5 or 3-5 performs learning between the input signal including object information and the measured communication quality even if the aforementioned deviation between the predicted communication quality and the measured communication quality is large. In the latter case, the communication quality learning unit 1-5 or 3-5 does not use, for learning, the object information and the measured communication quality in the case in which the deviation is large. In both the cases, it is possible to store, as low reliability condition, at least a part of the information input to the communication quality prediction unit 1-6 or 3-6. Alternatively, it is possible to continue to observe the deviation in prediction of the communication quality and to monitor convergence thereof. In a case in which the deviation remains to be large, the communication quality at the base station is affected by some parameters, and it is thus possible to generate an alarm signal.

The communication quality learning unit 1-5 or 3-5 can have a plurality of input and output relationships, actively learn any learning data for some input and output relationships, and perform learning using learning data that can be determined to have high estimation accuracy from learning results in the past in advance for other input and output relationships. In this manner, a plurality of input and output relationships can be prepared, and the communication prediction unit 1-6 can be caused to predict communication quality using the input and output relationships. Instead of the low reliability conditions, cases in which reliability (a correct answer rate of determination or how small an error is) is high may be stored as high reliability conditions. In this manner, the communication quality learning unit 1-5 or 3-5 stores a condition under which the reliability satisfies (or does not satisfy) predefined criteria (Step 4-1). The obtained condition is input to the communication prediction unit 1-6, and if an input signal with a condition under which the input and output relationship does not have sufficient reliability is input to the communication prediction unit 1-6, it is possible to apply additional information indicating inaccuracy to the communication quality prediction result or not to predict communication.

Second Evaluation Method

Importance of input information is evaluated. The communication quality learning unit 1-5 or 3-5 detects how much the input parameters have been referred to and extracts objects and parameters that have not been referred to (Step 4-2). It is possible to improve efficiency of the learning and the prediction as follows, for example, by outputting objects and parameters that have not been used or objects and parameters that have been used to the object detection unit 1-7 and the communication prediction unit 1-6 or 3-6.

The object detection unit 1-7 can reduce a burden of performing an operation or reduce the amount of information to be input to the communication prediction unit and the communication quality learning unit by designating conditions of the types of objects, the positions of objects, and states of objects that affect communication and not detecting objects other than these objects or discarding the detection results.

In a case in which the conditions of the types of objects, the positions of the objects, and the states of the objects that affect communication depend on a condition of the wireless terminal 2-i that is a target of communication, it is possible to acquire the terminal information fed back from the terminal 2-i, to optimize the conditions of the types of the objects, the positions of the objects, and the states of the objects that affect communication, and thereby to reduce a burden of performing an operation, or to reduce the amount of information to be input to the communication prediction unit and the communication quality learning unit.

Third Evaluation Method

Main components used for prediction are updated (Step 4-3). The communication quality learning unit 1-5 or 3-5 may perform main component analysis on learning data, extract a new feature amount, perform the dimensionality reduction method, and then perform updating. In a case in which the communication quality learning unit 1-5 or 3-5 has updated how to use the feature amount through the aforementioned analysis, the communication quality prediction unit processes the input parameters in accordance with the newly defined dimensionality reduction method and uses the processed parameters as parameters for predicting communication quality to predict communication quality with a newly defined input and output relationship.

Sixth Embodiment

Figure 6:
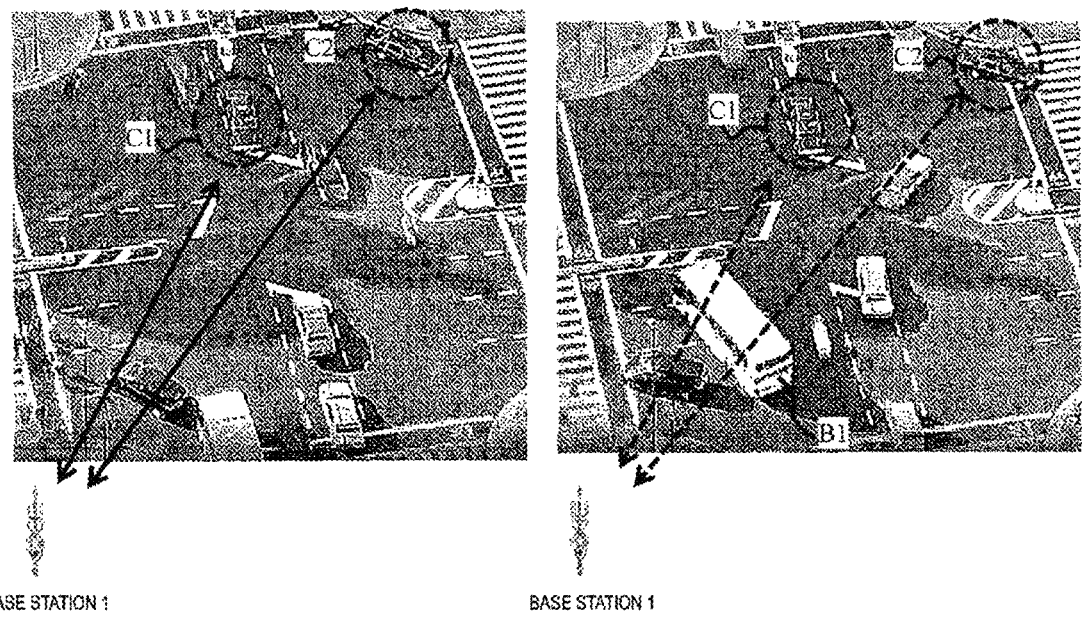
FIG. 6 is a diagram for explaining effects of the communication system according to the invention.

FIGS. 6(A) and 6(B) are images for explaining effects of the invention. FIG. 6(A) explains a state in which the base station 1 and cars (C1 and C2) that are wireless terminals 2 communicate with each other in a wireless manner (the arrow of the solid line in the left drawing) at an intersection. FIG. 6(B) explains a condition in which a large vehicle (B1) has turned left at the intersection and has blocked (the arrow of the broken line in the right diagram) a wireless propagation path.

The communication quality learning unit 1-5 of the base station 1 has learned, in advance, that a specific event related to communication quality, here, an event that continuation of a situation in which communication will be disconnected for a specific period of time occurs, by the communication prediction method according to the invention. Such an event is not necessarily caused by blocking of the propagation path and may occur due to a change in complicated propagation state at the intersection. The base station 1 acquires, by the surrounding object detection unit, that the large vehicle has approached and has started to turn left from a video captured by a mounted camera, and predicts, by the communication prediction unit 1-6, that a specific event will occur a specific time later or a time estimated from the moving speed of the large vehicle later, from the position, the speed, and the orientation of the vehicle.

Seventh Embodiment

Figure 7:
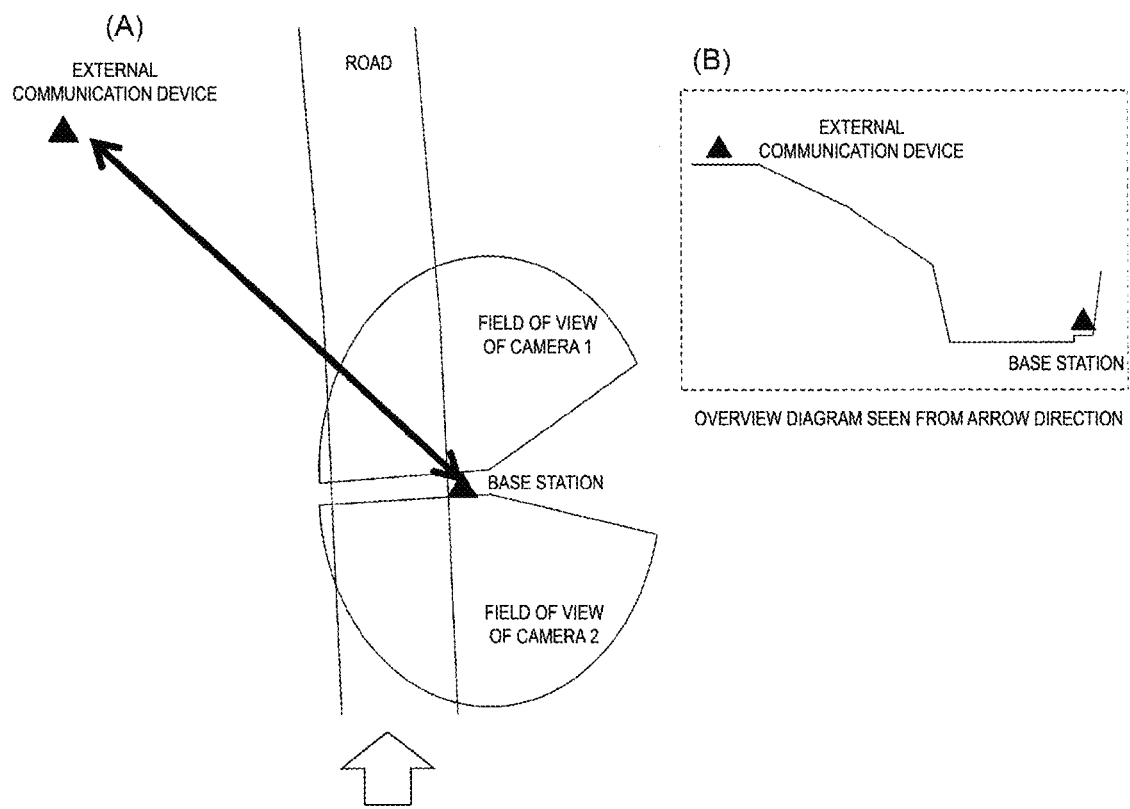
FIG. 7 is a diagram for explaining an experiment in the communication system according to the invention.

FIG. 7 is a diagram of an experiment conducted to check the effects of the invention. A wireless LAN base station and an external communication device (wireless terminal) were installed with a road interposed therebetween, and quality of future communication performed between the base station and the external communication device was predicted using videos of two cameras included in the base station. Here, the wireless LAN used a 5 GHz band channel, and a standardization throughput obtained by dividing a throughput per 20 MHz by an average in the past 30 seconds was used as communication quality. The communication quality was evaluated every 1 second. As the cameras, a camera 1 facing upward and a camera 2 facing downward were used.

Figure 8:
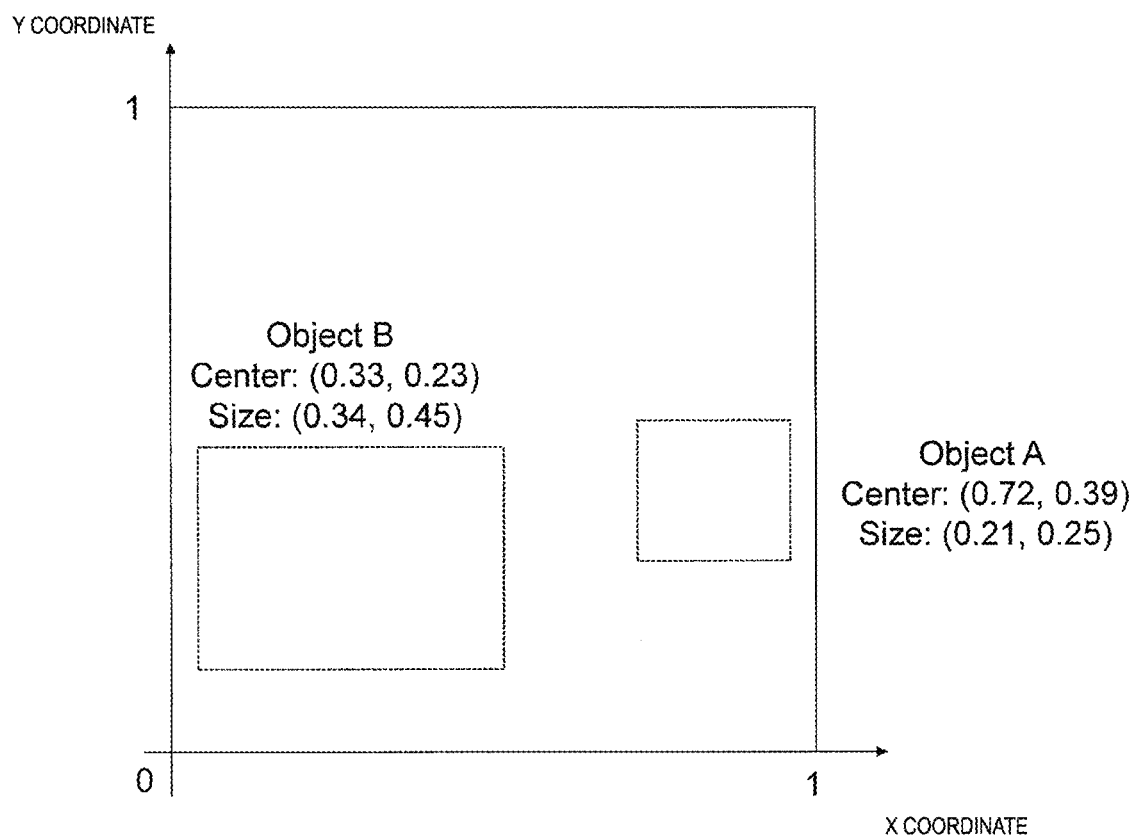
FIG. 8 is a diagram for explaining an experiment in the communication system according to the invention.
Figure 9:
FIG. 9 is a diagram for explaining an experiment in the communication system according to the invention.

Here, the videos from the cameras were acquired at 15 FPS, and the sizes on an X axis, the sizes on the Y axis, and the center positions of objects were extracted. Because fifteen pieces of object information were obtained at a cycle (1 second) of evaluating communication quality, fifteen pieces of position information and fifteen pieces of size information were averaged here, and the amounts of change in size and position with respect to the X axis and the Y axis were extracted as moving speeds. A detection example of sizes and positions of objects that were actually extracted by the object detection unit is illustrated in FIG. 8. A video imaged by the camera 1 in an actual environment and how a vehicle was recognized are illustrated in FIG. 9. Here, the location where the external communication device was present is also illustrated with a star mark for understanding. Although the communication path between the communication base station and the wireless terminal was not blocked even if a passenger car passed, the communication path was blocked in a case in which a bus passed therethrough in the surrounding environment.

Figure 10:
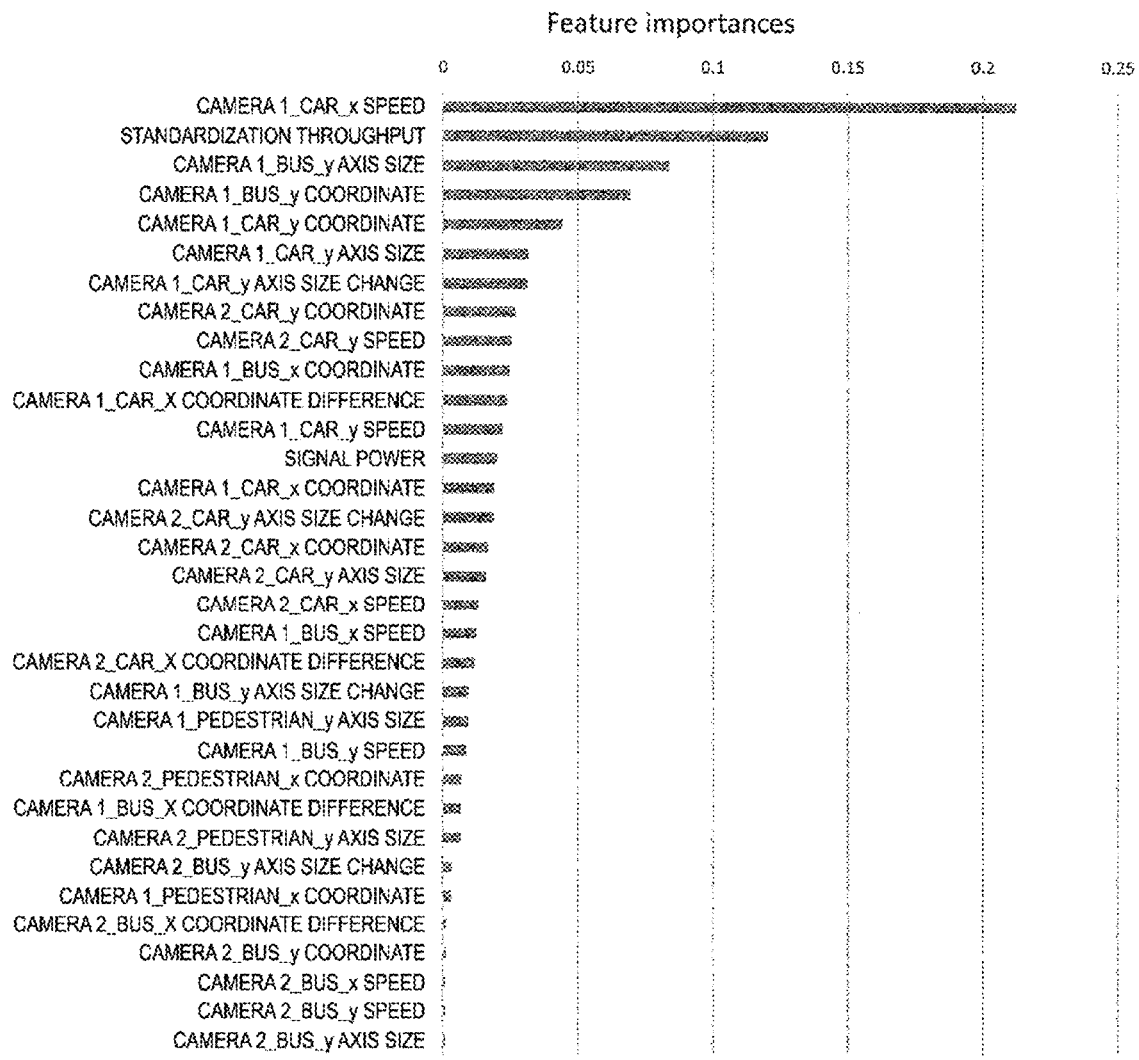
FIG. 10 is a diagram for explaining an experiment in the communication system according to the invention.

Information regarding cars (passenger cars), buses, and pedestrians acquired from the camera 1 and the camera 2, current communication quality, and a signal power obtained in the current communication were used to predict future communication quality of 2 seconds later. Here, random forest learning was used to predict communication. FIG. 10 illustrates a result of calculating importance of feature amounts that can be parameters that are output through the random forest learning. It was the speed of the passenger car detected by the camera 1 that most significantly affected determination. Communication quality at present (standardization throughput) was the next parameter, and the Y axis position of the bus detected by the camera 1 was the next parameter that affected determination. It is possible to understand that important object information differs for the car and for the bus. This can be considered to be because while the bus blocks the communication path and degrades the signal power, a propagation path of the electric waves dynamically changes due to reflection by a car regardless of the car not directly blocking the communication path, and this leads to a change in communication quality. It is possible to apply the result to Step 4-2 in FIG. 5, and not to use the result output by the camera 2, or not to use the bus/pedestrian objects detected by the camera 2. The method of dimensionality reduction may be updated in Step 4-3 in FIG. 5. Although FIG. 10 illustrates almost all pieces of data of output values, it is not necessary to calculate speeds along four axes, namely the X axis, the Y axis, the X axis of the size, and the Y axis of the size, and a result obtained by adding the four parameters in accordance with importance may be used. Although the X-axis and Y-axis positions were set from the positions in the image from the camera with a viewing angle of 180 degrees in the experiment, the positions may be converted into another coordinate system such as a coordinate system with reference to the base station or a coordinate system based on latitudes and longitudes and used, or the positions may be converted into position information on a general map and used.

Figure 11:
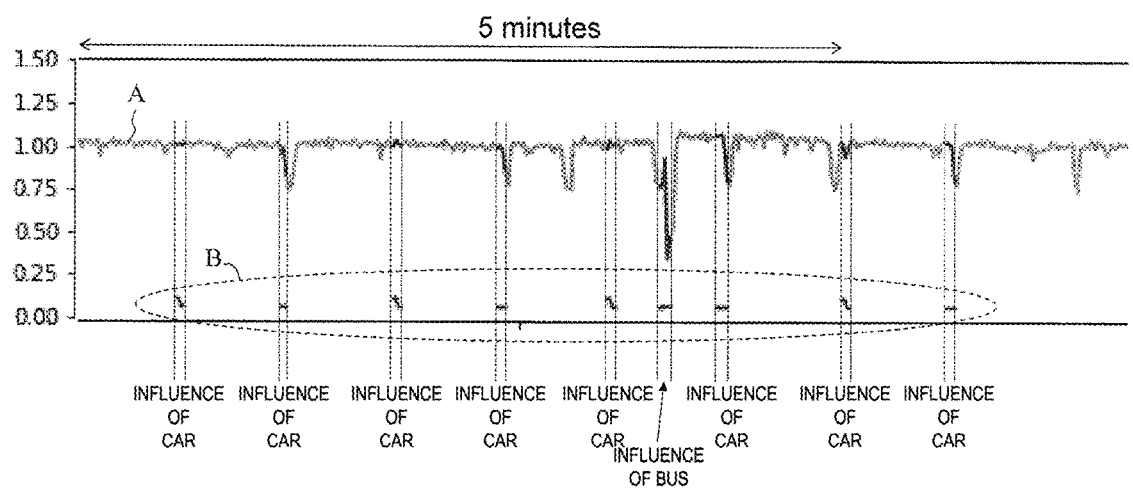
FIG. 11 is a diagram for explaining an experiment result of the communication system according to the invention.

FIG. 11 is a diagram for explaining a measured standardization throughput and handling at the time of detecting objects. The line A represents the standardization throughput, and the plot B represents timings at which objects were identified from a video of the camera 1. As the objects, types such as pedestrians (humans), motorcycles/bicycles (bikes), passenger cars (cars), and buses/trucks (buses) are defined.

It is possible to ascertain in FIG. 11 that the standardization throughput is affected by passing of a bus and a passenger car. In comparison between the bus and other vehicles, the standardization throughput (communication quality) is degraded when a bus passes, while the standardization throughput is not necessarily degraded when a car passes. In FIG. 7, the car moving from the upper side to the lower side of the road (moving from the range of the camera 1 to the range of the camera 2) has a larger influence on communication quality than the car moving from the lower side to the upper side of the road (moving from the range of the camera 2 to the range of the camera 1). This is considered to be because cars are supposed to travel on the left side in Japan and cars passing closer to the terminal affect more the communication quality.

Eighth Embodiment

Figure 12:
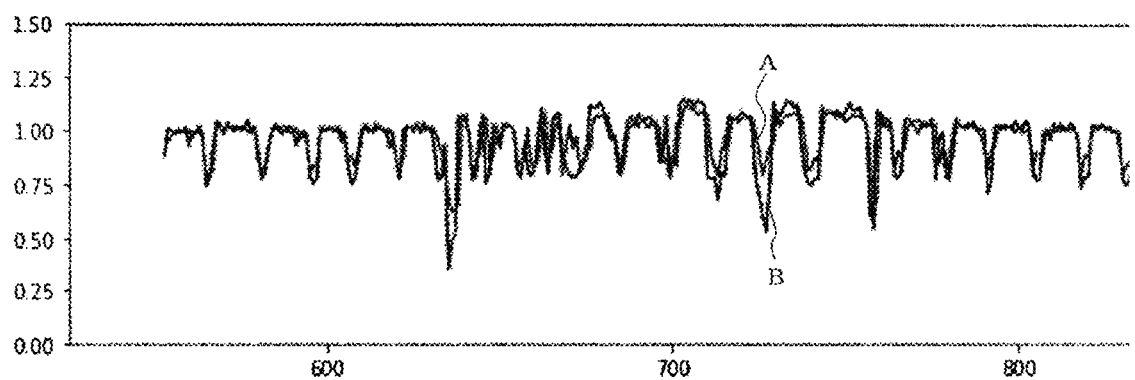
FIG. 12 is a diagram for explaining an experiment result of the communication system according to the invention.

FIG. 12 is a diagram for explaining a result of predicting communication quality of one second later. The communication quality learning unit uses random forest learning using 500 determination trees, uses data corresponding to three hours, divides the data into five by the k-fold cross validation method, and performs training with four data sets, thereby generating a learning model. The communication prediction unit predicts communication quality (standardization throughput) for the remaining one data set using the learning model. The input data is a video from the camera illustrated in FIG. 10 and communication information. The result represents a result that also includes a case in which only data at timings when cars and buses go back and forth near the terminal is extracted and there are no influences of passenger cars on communication quality as described above.

FIG. 12 illustrates comparison between predicted communication quality A and actually measured communication quality B. If degradation of communication quality is focused, the line of the communication quality A and the line of the communication quality B are lowered at the same time, and it is possible to confirm that the communication prediction unit is able to predict degradation of communication quality in actual measurement.

Ninth Embodiment

Figure 13:
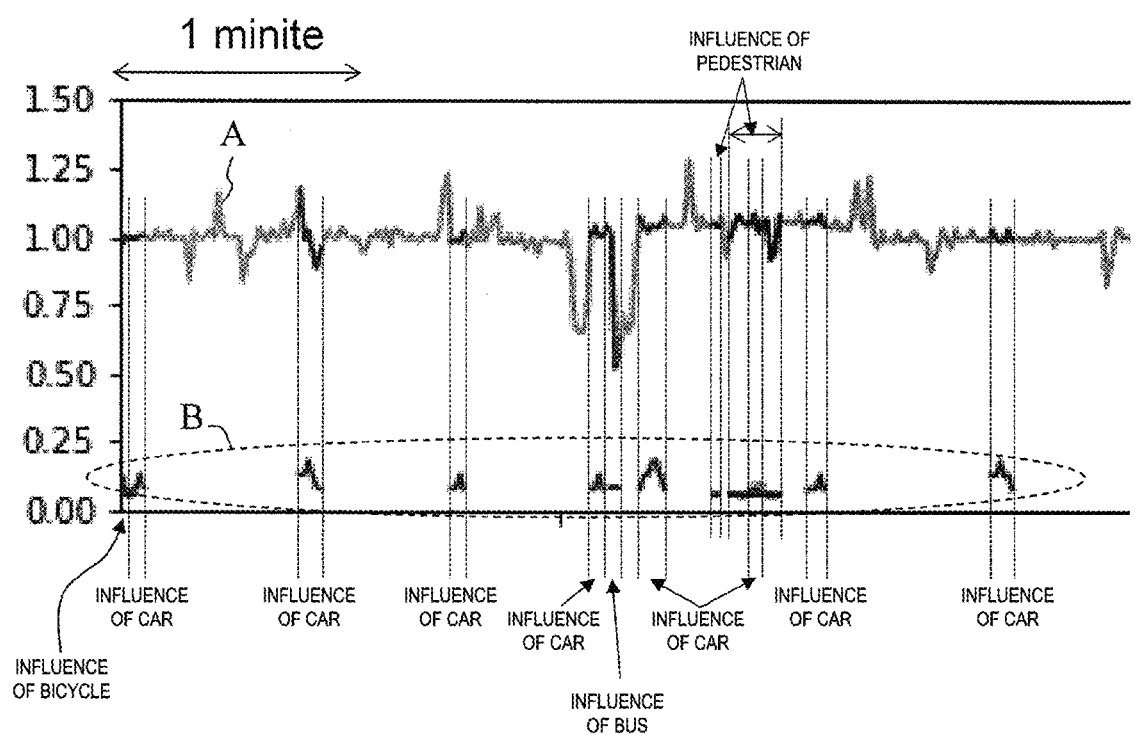
FIG. 13 is a diagram for explaining an experiment result of the communication system according to the invention.

In the ninth embodiment, the fact that position information of the wireless terminal significantly affects accuracy of predicted communication quality will be described. FIG. 13 is also a diagram for explaining a measured standardization throughput and handling at the time of detecting objects similarly to FIG. 11 in the seventh embodiment. The line A represents the standardization throughput, and the plot B represents timings at which objects were identified from a video of the camera 1. As the objects, types such as pedestrians (humans), motorcycles/bicycles (bikes), passenger cars (cars), and buses/trucks (buses) are defined. However, in the ninth embodiment, object detection based on the standardization throughput and the camera is performed with the wireless terminal moved by about 10 cm with respect to the seventh embodiment. Communication quality is not affected by passing of passenger cars at all but is affected by passing of buses in the ninth embodiment as well.

FIG. 15 is a result of comparison between the communication quality A predicted as in FIG. 12 of the eighth embodiment and actually measured communication quality B. However, the communication quality A is a result of performing prediction with an input and output relationship learned with data before the wireless terminal is caused to move. In other words, the communication quality A is a result of performing prediction with a learning model of deviating position information of the wireless terminal. The timing illustrated with circles is a timing at which no degradation occurred in the actually measured standardization throughput while the communication prediction unit predicted occurrence of degradation of the standardization throughput due to the passenger car. The timing illustrated with squares is a timing at which the communication prediction unit predicted that degradation of the standardization throughput occurred due to the bus and degradation also occurred in the actually measured standardization throughput.

Figure 14:
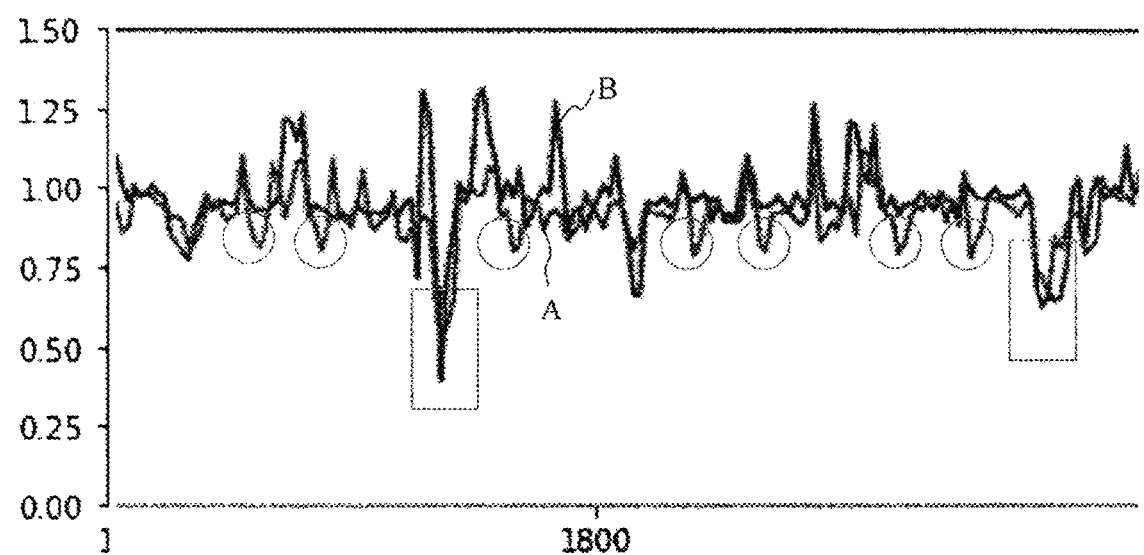
FIG. 14 is a diagram for explaining an experiment result of the communication system according to the invention.

In this manner, the object information to be used is changed by the position information of the wireless terminal, and it is necessary to change the input and output relationship. On the other hand, excessively high accuracy of position information of the wireless terminal leads to an increase in information needed for learning and an increase in cost. It is also possible to group wireless terminal information (position information, in particular) to which an input and output relationship with the same conditions can be applied, by determining whether or not the input and output relationship can be applied in Step 4-1 in FIG. 5. It is desirable that the communication quality learning unit 1-5 or 3-5 perform learning under a condition of a case in which the wireless terminal is present in a certain range and the input and output relationship be used only within the range. For example, one-hot processing or position information reduction processing is performed such that the position of the wireless terminal corresponding to the grouping processing is the same information when the position information is input to the communication prediction unit. Alternatively, it is also possible to implement this by turning on or off the information to be used depending on a location while using the input and output relationship itself. In the example in FIG. 14, the communication quality at the circles in the drawing is prevented from being determined to have been degraded, by not inputting the object information of the passenger car to the communication prediction unit at this location.

Other Embodiments

The base station 1 in the aforementioned first and second embodiments may be implemented by a computer. In such a case, the base station 1 may be implemented by recording a program for implementing each of components included in the base station 1 in a computer-readable recording medium and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a computer-readable recording medium that stores programs dynamically for a short period of time, one example of which is a communication line used when a program is sent via a communication channel such as a network (e.g., the Internet) and a telephone line, and may also include such a computer-readable recording medium that stores programs for a certain period of time, one example of which is volatile memory inside a computer system that functions as a server or a client in the above-described case. In addition, the program described above may be a program used for implementing some of the components described above, a program that can implement the components described above by being combined with a program that has already been recorded in a computer system, or a program that is realized using hardware such as a programmable logic device (PLD) or a field programmable gate array (FPGA).

The embodiments of the present invention have been described above in detail with reference to the drawings. However, specific configurations are not limited to those embodiments, and include any design or the like within the scope not departing from the gist of the present invention.

Additional Description

An overview of the invention is summarized as follows.

A communication system that uses surrounding environment information of a base station acquired by a camera, a sensor, and the like and terminal information including one or more pieces of information regarding position information/an orientation/a posture/an ID/a state pf the terminal/control of a terminal component/terminal control to predict current or future communication quality. An input and output relationship for outputting communication quality is learned using the surrounding environment information, the terminal information, and the communication quality to create a learning model, and the communication quality is predicted using the learning model, the surrounding environment information, and the terminal information. It is also possible to improve accuracy using a positional relationship with the communication device that is a target of communication, to predict communication quality for a plurality of future operation patterns, to store a correct answer rate of the prediction, and to extract information in a case of a prediction error and feedback the information to the learning unit.

REFERENCE SIGNS LIST

1, 1-1, . . . , 1-L Base station
1-0 Network
1-1 Communication evaluation unit
1-2 Base station management unit
1-3 Surrounding environment information collection unit
1-4 Communication unit
1-5 Communication quality learning unit
1-6 Communication prediction unit
1-7 Object detection unit
2, 2-1, . . . , 2-M Wireless terminal
2-4, 2-4-1, . . . , 2-4-M Terminal communication unit
2-8, 2-8-1, . . . , 2-8-M Feedback generation unit
3-0 External network
3-1 Communication evaluation unit
3-5 Communication quality learning unit
3-6 Communication prediction unit

The invention claimed is:

1. A communication system including a base station that communicates with a wireless terminal, the system comprising:
a base station management unit generates base station management information including at least position information of the wireless terminal;
an object detection unit extracts a predetermined object from surrounding information about the base station's surroundings and outputs the predetermined object along with a feature amount of the object as object information;
a communication quality learning unit performs machine learning on a relationship between quality of communication between the base station and the wireless terminal and both the base station management information and the object information to generate a learning model; and a communication prediction unit applies the base station management information generated by the base station management unit and the object information output by the object detection unit to the learning model generated by the communication quality learning unit to predict communication quality of a predetermined period of time later.

2. The communication system according to claim 1, wherein the base station management information includes unique information of the wireless terminal provided as a notification from the wireless terminal.

3. The communication system according to claim 1, wherein the object information is obtained by performing statistical processing on a plurality of pieces of the object information acquired at different times.

4. The communication system according to claim 1, further comprising: an updating unit updates an object definition that designates the predetermined object extracted by the object detection unit.

5. The communication system according to claim 1, wherein the communication quality learning unit uses steady time communication quality obtained by collecting information regarding the communication quality to information regarding the wireless terminal for a specific period of time and performing statistical processing on the collecting information, to perform machine learning with the communication quality that is more than a predetermined threshold value away from the steady time communication quality.

6. A base station of a communication system, which communicates with a wireless terminal, the base station comprising:

a base station management unit generates base station management information including at least position information of the wireless terminal;

an object detection unit extracts a predetermined object from surrounding information about the base station's surroundings and outputs the predetermined object along with a feature amount of the object as object information;

a communication quality learning unit performs machine learning on a relationship between quality of communication between the base station and the wireless terminal and both the base station management information and the object information to generate a learning model; and a communication prediction unit applies the base station management information generated by the base station management unit and the object information output by the object detection unit to the learning model generated by the communication quality learning unit to predict communication quality of a predetermined period of time later.

7. The base station according to claim 6, wherein the base station management information includes unique information of the wireless terminal provided as a notification from the wireless terminal.

8. The base station according to claim 6, wherein the object information is obtained by performing statistical processing on a plurality of pieces of the object information acquired at different times.

9. The base station according to claim 6, further comprising: an updating unit updates an object definition that designates the predetermined object extracted by the object detection unit.

10. The base station according to claim 6, wherein the communication quality learning unit uses steady time communication quality obtained by collecting information regarding the communication quality to information regarding the wireless terminal for a specific period of time and performing statistical processing on the collecting information, to perform machine learning with the communication quality that is more than a predetermined threshold value away from the steady time communication quality.

11. A base station of a communication system, which communicates with a wireless terminal, the base station comprising:

a base station management unit generates base station management information including at least position information of the wireless terminal;

an object detection unit extracts a predetermined object from surrounding information about the base station's surroundings and outputs the predetermined object along with a feature amount of the object as object information;

a communication prediction unit applies the base station management information generated by the base station management unit and the object information output by the object detection unit to the learning model generated by a communication quality learning unit to predict communication quality of a predetermined period of time later; and a communication unit, wherein the communication unit transfers the communication quality, the base station management information, and the object information to the communication quality learning unit that is provided outside, and receives the learning model from the communication quality learning unit to transfer the learning model to the communication prediction unit, wherein the communication quality learning unit performs machine learning on a relationship between quality of communication between the base station and the wireless terminal and both the base station management information and the object information to generate a learning model.

12. The base station according to claim 11, wherein the base station management information includes unique information of the wireless terminal provided as a notification from the wireless terminal.

13. The base station according to claim 11, wherein the object information is obtained by performing statistical processing on a plurality of pieces of the object information acquired at different times.

14. The base station according to claim 11, further comprising: an updating unit updates an object definition that designates the predetermined object extracted by the object detection unit.

15. A base station of a communication system, which communicates with a wireless terminal, the base station comprising:

a base station management unit generates base station management information including at least position information of the wireless terminal;

an object detection unit extracts a predetermined object from surrounding information about the base station's surroundings and outputs the predetermined object along with a feature amount of the object as object information; and a communication unit, wherein the communication unit transfers the communication quality, the base station management information, and the object information to a communication quality learning unit that is provided outside, transfers the base station management information and the object information to a communication prediction unit that is provided outside, and receives the communication quality of the predetermined period of time later from the communication prediction unit, wherein the communication quality learning unit performs machine learning on a relationship between quality of communication between the base station and the wireless terminal and both the base station management information and the object information to generate a learning model, wherein the communication prediction unit applies the base station management information generated by the base station management unit and the object information output by the object detection unit to the learning model generated by the communication quality learning unit to predict communication quality of a predetermined period of time later.

16. The base station according to claim 15, wherein the base station management information includes unique information of the wireless terminal provided as a notification from the wireless terminal.

17. The base station according to claim 15, wherein the object information is obtained by performing statistical processing on a plurality of pieces of the object information acquired at different times.

18. The base station according to claim 15, further comprising: an updating unit updates an object definition that designates the predetermined object extracted by the object detection unit.

* * * * *